Patented Mar. 9, 1926.

1,576,122

UNITED STATES PATENT OFFICE.

DUANE E. WEBSTER, OF WORCESTER, MASSACHUSETTS, ASSIGNOR TO NORTON COMPANY, OF WORCESTER, MASSACHUSETTS, A CORPORATION OF MASSACHUSETTS.

ABRASIVE ARTICLE.

No Drawing.   Application filed February 4, 1924. Serial No. 690,662.

*To all whom it may concern:*

Be it known that I, DUANE E. WEBSTER, a citizen of the United States of America, residing at Worcester, in the county of Worcester and State of Massachusetts, have invented certain new and useful Improvements in Abrasive Articles, of which the following is a full, clear, and exact specification.

My invention relates to abrasive articles and more particularly to grinding wheels having granular abrasive material bonded together by an organic bond.

It has been found that a suitable bonding medium for abrasive articles is the solid condensation product of formaldehyde and phenol which is sold on the market under various trade names such as bakelite, condensite and redmanol.

It is found that abrasive wheels made up of such condensation products of formaldehyde and phenol are not of sufficient hardness and durability for certain cutting purposes, and it is accordingly the main object of my invention to provide a bond mixture which will give a harder and more durable grinding body than may be obtained by using such synthetic products alone.

In accordance with my invention, I propose to incorporate plaster of Paris in an abrasive article of this type, as I have discovered that this calcium sulphate has the remarkable property of combining with the synthetic condensation product of formaldehyde and phenol to form a very durable and hard cement-like material which is well adapted for the manufacturing of grinding implements.

As a specific illustration of one type of abrasive article embodying my invention, I may form a grinding wheel of a suitable abrasive, such as crystalline alumina or silicon carbide, combined with such synthetic product as is above described, and plaster of Paris. While I may employ the plaster of Paris in proportions varying from ½ to 30%, I preferably use a mixture of 10 to 15% of plaster of Paris in order to obtain the harder grades of grinding wheel. As a specific illustration of one suitable composition, I may employ 73% of crystalline alumina grain, 15% of the phenol-formaldehyde condensation product and 12% of plaster of Paris by weight.

These materials may be combined and shaped into a grinding wheel by suitable means and methods. As an example of one method which may be employed, I prefer to heat the abrasive material and then add the phenol-formaldehyde product and plaster of Paris thereto and mix them in a suitable machine. When the mass has been suitably mixed I cool it and crush to a size which is preferably slightly larger than that of the individual abrasive grains, so that each grain will carry a small amount of bonding material clinging thereto. Desired proportions of these materials are weighed out and the mixture is then shaped in a mold of a suitable form, after which the mass is heated or baked at a temperature which will set or harden the bonding material. I prefer to heat the mixture at about 320 degrees F. for approximately ten hours.

In accordance with this invention I have provided an abrasive article which is at least a grade harder than articles made of a shellac bond or other similar materials, and I thereby enlarge the range of utility within which articles of this type may be employed. A harder wheel of this type is more dense than one made without the plaster of Paris. Because of its extreme hardness it has a much longer operating life than heretofore obtainable and gives better finish on the work.

Having thus described my invention, what I claim as new and desire to secure by Letters Patent is:

1. An abrasive article comprising granular abrasive material bonded by a condensation product of formaldehyde and phenol combined with plaster of Paris.

2. An abrasive article having abrasive grains united by a heat-set bond comprising a condensation product of formaldehyde and phenol combined with plaster of Paris forming from ½ to 30% by weight of the total mass.

Signed at Worcester, Massachusetts, this 29th day of January 1924.

DUANE E. WEBSTER.